United States Patent [19]

Yabe et al.

[11] Patent Number: 4,705,144
[45] Date of Patent: Nov. 10, 1987

[54] SPRING OPERATING MECHANISM FOR A CIRCUIT INTERRUPTER

[75] Inventors: Kiyoshi Yabe; Akiyoshi Onuma, both of Amagasaki, Japan

[73] Assignee: Mitsubishi Denki Kabushiki Kaisha, Amagasaki, Japan

[21] Appl. No.: 874,695

[22] Filed: Jun. 16, 1986

[30] Foreign Application Priority Data

Jun. 17, 1985 [JP] Japan ................ 60-130043

[51] Int. Cl.$^4$ .................. G05G 17/00; F03G 1/00; F16H 29/02
[52] U.S. Cl. ........................ 185/40 R; 74/2; 74/116; 74/577 M; 188/82.4
[58] Field of Search .............. 74/2, 116, 577 M; 185/40 R, 39; 188/82.4, 82.3

[56] References Cited

U.S. PATENT DOCUMENTS

| | | | |
|---|---|---|---|
| 1,209,917 | 12/1916 | Westinghouse | 74/116 |
| 1,702,777 | 2/1929 | Hewitt | 188/82.3 X |
| 2,256,466 | 9/1941 | Cullin | 74/116 |
| 2,746,718 | 5/1956 | French | 74/116 X |
| 3,138,344 | 6/1964 | Small | 188/82.3 X |

*Primary Examiner*—Allan D. Herrmann
*Attorney, Agent, or Firm*—Leydig, Voit & Mayer

[57] ABSTRACT

A spring operating mechanism for a circuit interrupter comprises means for converting the rotation of an electric motor into a rocking motion of a pawl, a ratchet wheel having teeth for being engaged by the pawl to be rotated by the rocking motion of the pawl and a closing spring which is charged by the rotation of the ratchet wheel, whereby energy charged in the closing spring is used for the closing and the tripping of the circuit interrupter. The mechanism comprises a catch arranged to come into engagement with the tip of the pawl when the tip of the pawl begins to ride on a large-diameter outer circumferential toothless portion of the ratchet wheel and to be brought out of the above engagement by the rocking motion of the pawl.

1 Claim, 9 Drawing Figures

SPRING OPERATING MECHANISM FOR A CIRCUIT INTERRUPTER

BACKGROUND OF THE INVENTION

This invention relates to a spring-type operating mechanism for a circuit interrupter in which the rotational force of an electric motor charges a spring and the charged spring energy is used to close and open the circuit interrupter, and particularly to the improvements thereof.

One example of a conventional spring-type operating mechanism for a circuit interrupter, which has the structure shown in FIGS. 1 to 3, will be explained. In FIG. 2, a lever 3 is rotatably mounted on a pin 2 supported by a frame 1, and a pin 4 on one end of the lever 3 is connected to an unillustrated interrupting unit and is biased in the direction of an arrow C by means of an unillustrated opening spring. A groove 5 is formed in the other end of the lever 3 and a roller 6 is rotatably mounted within the groove 5 on a pin 7. Also, a pin 8 is rotatably supported by the lever 3 within the groove 5 so that it engages a latch 10 rotatably supported by the frame 1 through a pin 9 to prevent the lever 3 from rotating counterclockwise in the figure in the direction of the arrow C about the pin 2 due to the biasing force. While the latch 10 is urged to rotate clockwise in the figure about the pin 9 due to a force from the pin 8, the latch 10 is prevented from doing so by contact with a trigger 12 rotatably mounted on the frame 1 through a pin 11. The latch 10 and the trigger 12, are provided with return springs 13 and 14, respectively. The end of the trigger 12 opposite from the end which engages the latch 10 abuts against a plunger 15 which moves to the right in FIG. 2 when a tripping electromagnet 16 is energized. The frame 1 also rotatably supports a main shaft 17 on which a cam 18 is secured.

As shown in FIG. 3, a ratchet wheel 19 is fixed on the main shaft 17 and has a groove 20 formed in its entire outer circumference, and teeth 21 are provided on both sides of the groove 20 over about a half of the circumference as shown in FIG. 1. While the ratchet wheel 19 is urged to rotate in the counterclockwise direction as viewed in FIG. 3 by a closing spring 37 which will be explained later, its rotation is prevented by the engagement of a pin 22 rotatably mounted on the ratchet wheel 19 with a latch 24 rotatably mounted on the frame 1 by a pin 23. While the latch 24 is urged to rotate counterclockwise as viewed in FIG. 3 by the force applied to it through the pin 22, its rotation is prevented by engagement with a trigger 26 rotatably mounted on the frame 1 by a pin 25. The latch 24 and the trigger 26 are provided with return springs 27 and 28. The trigger 26 is adapted to abut against the end of a plunger 29 which moves to the right in FIG. 3 when the closing electromagnet 30 is energized. The frame 1 also rotatably supports an eccentric shaft 31 in the vicinity of the ratchet wheel 19. The eccentric shaft 31 is connected to an unillustrated electric motor. The eccentric shaft 31 has formed thereon two eccentric portions on which a smaller pawl 32 and a larger pawl 33 are rotatably mounted. The smaller and the larger pawls 32 and 33 engage the teeth 21 of the ratchet wheel 19 and rock as the eccentric shaft 31 rotates to cause the counterclockwise rotation of the ratchet wheel 19. One end of a spring rod 34 is rotatably mounted on the ratchet wheel 19 through a pin 35 and the other end of the spring rod 34 engages the spring holder 36. The spring holder 36 contacts one end of a closing spring 37 disposed within a spring guide 38 to receive the spring force in the state shown in the figure. This spring force is transmitted to the main shaft 17 to rotate it counterclockwise.

The operation of the above-described apparatus will now be described, with an interrupting operation being first explained. In FIG. 2, when the tripping electromagnet 16 is excited, the plunger 15 moves to the right in the figure and pushes the trigger 12, rotating it clockwise, thereby disengaging the trigger 12. Then the latch 10 rotates clockwise and disengages from the pin 8. The lever 3 is then rotated counterclockwise by the spring force in the direction of the arrow C and opens the unillustrated interrupting unit connected to the pin 4. In this case, since the main shaft 17 does not rotate, the portion illustrated in FIG. 3 is not operated and remains in the illustrated position during the interruption. FIG. 4 shows the state of the parts shown in FIG. 2 after the completion of the interrupting operation.

Next, the closing operation will be described. Referring to FIGS. 3 and 4, when the closing electromagnet 30 is excited, the plunger 29 moves to the right in FIG. 3 and abuts against the trigger 26, causing it to rotate in the clockwise direction, so that the engagement between the trigger 26 and the latch 24 is released and the latch 24 is rotated counterclockwise to disengage from the pin 22. This causes the ratchet wheel 20 together with the main shaft 17 to be rotated counterclockwise by the spring force of the closing spring 37. The rotation of the main shaft 17 causes the cam 18 to rotate counterclockwise, and as the cam 18 rotates counterclockwise from the position shown in the figure, the roller 6 rolls on the cam surface of the cam 18 and rotates the lever 3 clockwise, whereby the unillustrated interrupting unit connected to the pin 4 is closed and the unillustrated trip spring is charged. When the lever 3 is rotated clockwise to the position shown in FIG. 5, the latch 10 and the trigger 12 return due to the return springs 13 and 14, and the latch 10 engages the pin 8, so that even if the cam 18 rotates further and the roller 6 is separated from the cam surface, the rotation of the lever 3 in the counterclockwise direction due to the spring force in the direction of the arrow C of the trip spring is prevented and the closed position is maintained.

On the other hand, the main shaft 17 is rotated counterclockwise by the spring force of the closing spring 37 applied through the spring holder 36, the spring rod 34, and the ratchet wheel 19 until it reaches the lower dead point which is the most expanded state of the closing spring 37, and the main shaft 17 further rotates due to the rotational energy in the main shaft 17, the cam 18 and the ratchet wheel 19 provided by the closing spring 37 while charging the closing spring 37, and after pausing for a while, the main shaft 17 commences to be rotated clockwise by the closing spring force until it is stopped by the engagement of the teeth 21 of the ratchet wheel 19 with the tips of the smaller pawl 32 and the larger pawl 33.

FIG. 5 illustrates the state of the portion shown in FIG. 4 after the closing operation has been completed, and FIG. 6 illustrates the state of the portion shown in FIG. 3.

Next, the closing spring charging operation will be described. When the eccentric shaft 31 is rotated by the unillustrated electric motor from the state shown in FIG. 6 in which the tips of the smaller pawl 32 and the larger pawl 33 engage the teeth 21 of the ratchet wheel 19, rocking motions effected in the tips of the smaller pawl 32 and the larger pawl 33 push the teeth 21 to rotate the ratchet wheel 19 counterclockwise. As the ratchet wheel 19 rotates the main shaft 17 rotates and the closing spring 37 is charged. When the ratchet wheel 19 is rotated close to the position shown in FIG. 3, the latch 24 and the trigger 26 are returned to their original position due to the return springs 27 and 28, and when the ratchet wheel 19 is rotated counterclockwise beyond the state in which the spring is most compressed by the closing spring 37, the pin 22 on the ratchet wheel 19 engages the latch 24 to maintain the charged condition of the closing spring previously described and shown in FIG. 3.

In such a conventional spring-type operating mechanism, at the last moment of the closing operation in which the teeth 21 of the ratchet wheel 19 engage with the smaller and the larger pawls 32 and 33, these pawls are subjected to impacts of excessive torque due to the closing spring 37. Therefore, the teeth 21 of the ratchet wheel 19 and the tips of the smaller pawl 32 and the larger pawl 33 may be damaged in such a manner that the charging of the closing spring cannot be effected.

SUMMARY OF THE INVENTION

An object of the present invention is to provide an operating mechanism for a circuit interrupter which solves the above problems of the conventional operating mechanism.

Another object of the present invention is to provide a reliable spring-type operating mechanism for a circuit interrupter in which the teeth of the ratchet wheel and the tips of the smaller pawl and the larger pawl are not subject to damage.

With the above objects in view, the operating mechanism for a circuit interrupter according to the present invention comprises a catch arranged to come into engagement with the tip of the pawl when the tip of the pawl rides on a large-diameter outer circumferential toothless portion of the ratchet wheel and to be taken out of the above engagement by the rocking motion of the pawl.

The catch of the present invention functions to come into engagement with the tip of the pawl when the tip of the pawl rides on a large-diameter outer circumferential toothless portion of the ratchet wheel to hold the pawl, and to prevent the engagement of the pawl with the teeth of the ratchet wheel protecting the pawl and the teeth of the ratchet wheel from receiving impact forces. When the pawls start a rocking motion, the catch come out of engagement with the tip of the pawl, allowing the pawl to engage with the teeth of the ratchet wheel.

BRIEF DESCRIPTION OF THE DRAWINGS

FIG. 7 is a view illustrating the closing spring charged state, FIG. 8 is a view showing the closing spring discharging state, and FIG. 9 is a view showing the closing spring discharged state.

PREFERRED EMBODIMENT OF THE INVENTION

Figure 1:
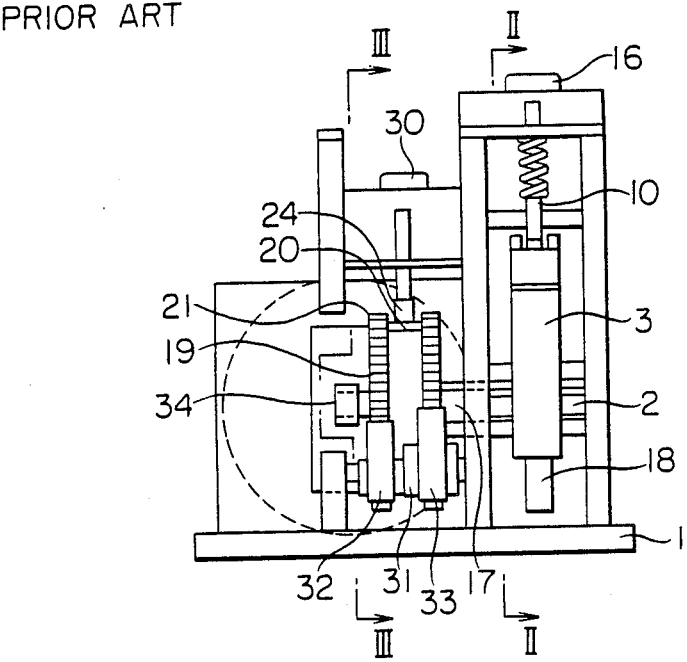
FIG. 1 is a side view showing a conventional spring operating apparatus.
Figure 2:
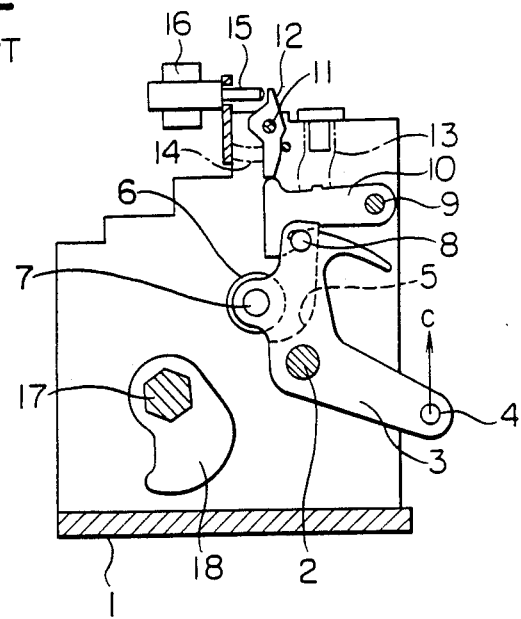
FIG. 2 is a sectional view taken along the line II—II of FIG. 1 showing the state in which the circuit interrupter is closed and the closing spring is charged.
Figure 3:
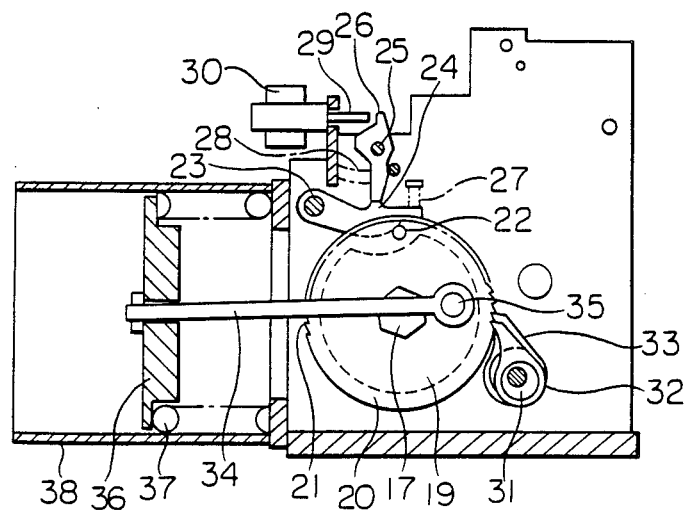
FIG. 3 is a sectional view taken along the line III—III of FIG. 1 showing the state in which the circuit interrupter is closed and the closing spring is charged.
Figure 4:
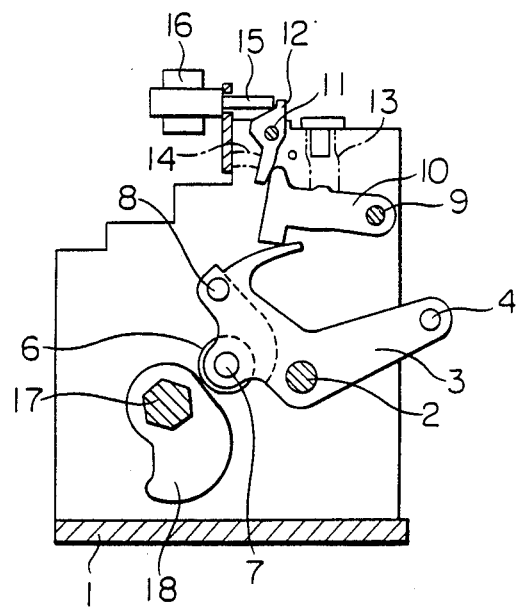
FIG. 4 is a sectional view showing the state of the components shown in FIG. 2 after the trip operation has been completed.
Figure 5:
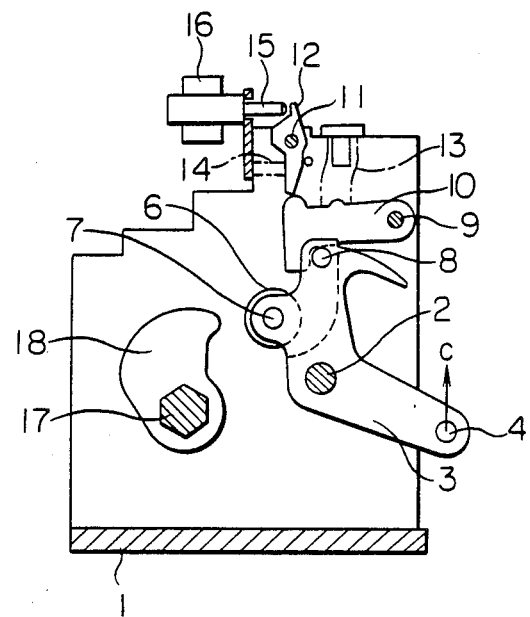
FIG. 5 is a sectional view showing the state of the components shown in FIG. 4 after the closing operation has been completed.
Figure 6:
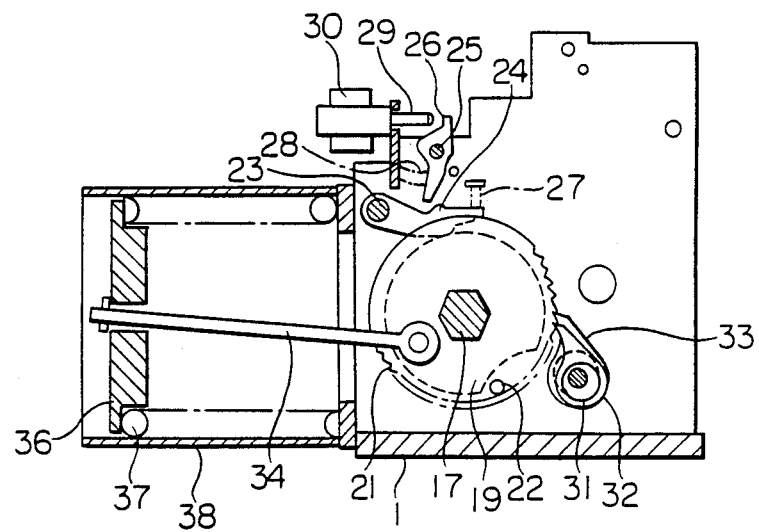
FIG. 6 is a sectional view showing the state of the components shown in FIG. 3 after the closing operation has been completed.
Figure 7:
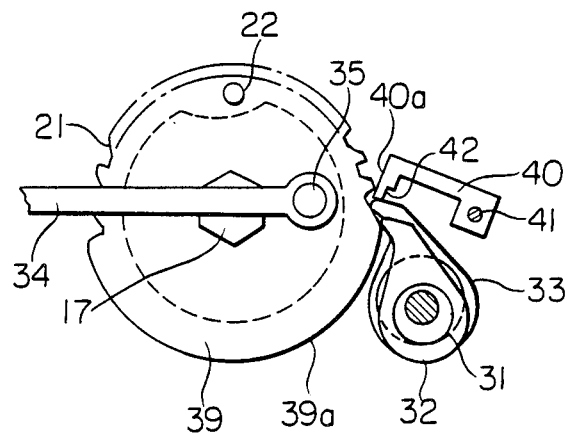
FIGS. 7, 8 and 9 are enlarged partial front view showing the pawls and the ratchet wheel of one embodiment of the spring operating apparatus for a circuit interrupter constructed in accordance with the present invention.
Figure 8:
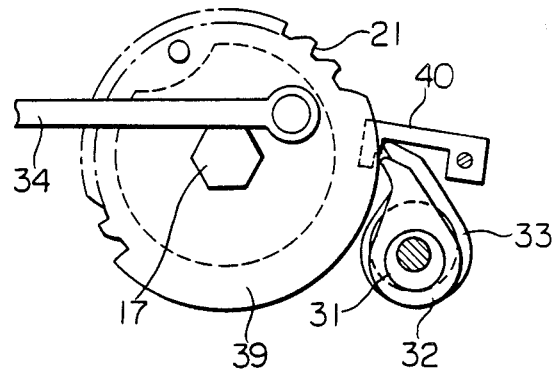
Figure 9:
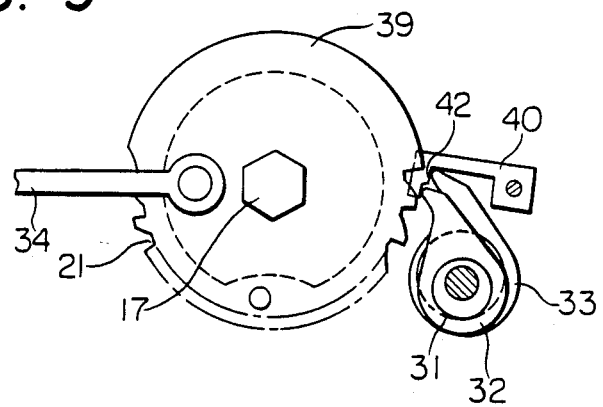

FIG. 7 illustrates the structure of the components of the present invention which correspond to the pawl, the ratchet wheel, the main shaft and the spring rod of the conventional design shown in FIG. 3. In accordance with the present invention, the ratchet wheel 39 has a large-diameter peripheral toothless portion 39a which has a diameter slightly larger than the outer circle of the teeth 21 for about one half of the periphery of the ratchet wheel 39. In the vicinity of the outer periphery of the ratchet wheel 39, a catch 40 is pivotally supported by a pin 41 secured to the frame 1 (not shown in FIG. 7). A free end 40a of the catch 40 is arranged such that, when the tips of the small pawl 32 and the large pawl 33 ride on the large-diameter peripheral portion 39a of the ratchet wheel 39 as shown in FIG. 8, the end 40a of the catch 40 is rotated by its own weight to engage the tips of the small and the large pawls 32 and 33 so that the end 40a of the catch 40 is inserted between the tips of the small pawl 32 and the large pawl 33 and the ratchet wheel 39. The teeth 21 of the ratchet wheel 39 and the small pawl 32 and the large pawl 39 are dimensioned such that they do not contact with each other in the state in which the catch 40 holds the tips of the small pawl 32 and the large pawl 33. Also, as best shown in FIGS. 7 and 9, the free end portion 40a of the catch 40 is provided at its inner side with a step 42. Except for the components shown in FIG. 7, the structure of the spring operating apparatus of the present invention is identical to that of the conventional spring operating apparatus shown in FIGS. 1 to 6, so that their description is omitted here.

The operation will now be described. However, since the operations other than the closing operation and the spring charging operation are similar to those of the conventional design, their description will be omitted.

In FIG. 7, as the ratchet wheel 39 is rotated counterclockwise by the closing spring force in the closing operation in a manner similar to the conventional design, the small pawl 32 and the large pawl 33 ride on the large-diameter portion 39a of the ratchet wheel 39 in which no teeth are formed, the free end 40a of the catch 40 is inserted between the small pawl 32 and the large pawl 33 and the ratchet wheel 39. The ratchet wheel 39 rotates to the dead bottom point of the closing spring 37, and further rotates while re-charging the closing spring 37 due to the rotating energy of the main shaft 17, the cam 18 and the ratchet wheel 39 provided from the closing spring 37 until the energy has charged in the closing spring 37. Then the ratchet wheel 39 begins to rotate clockwise which is opposite to the previous rotation due to the closing spring, but since the small pawl 32 and the large pawl 33 are held by the catch 40 at this time, the tips of the pawls cannot be brought into contact with the teeth 21 of the ratchet wheel 39. The state in which the closing operation has been completed is illustrated in FIG. 9.

The closing spring charging operation will now be described. In FIG. 9, as the eccentric shaft 31 is rotated by an unillustrated electric motor in the same manner as that in the conventional design, the small pawl 32 and the large pawl 33 rock. The tips of the small pawl 32 and the large pawl 33 engage the step 42 of the catch 40 and lift the catch 40 up by their rocking motion, resulting in disengagement of the small and large pawls 32 and 33 from the free end 40a of the catch 40. Therefore, the step 42 is the portion that causes the catch 40 to be disengaged from the pawls. Thereafter, since the tips of the small pawl 32 and the large pawl 33 engage with the teeth 21 of the ratchet wheel 39 and push the teeth by their rocking motion, the ratchet wheel 39 is rotated counterclockwise, thereby charging the closing spring 37.

While the description of the embodiment has been made in terms of a spring operating mechanism for a circuit interrupter, the present invention is equally applicable to a spring operating mechanism for other devices such as disconnectors and switches.

As has been described, since the arrangement of the present invention comprises a catch for holding the pawls at the final stage of the closing spring discharging operation, the tips of the teeth of the ratchet wheel and the pawls are not damaged, providing a reliable spring operating apparatus.

What is claimed is:

1. A spring operating mechanism for a circuit interrupter comprising at least one pawl having a tip, means for effecting a rocking motion of said pawl, a ratchet wheel having teeth for being engaged by said pawl and an outer circumferential toothless portion having a larger diameter than the diameter at the teeth, said ratchet wheel being rotated by the rocking motion of said pawl, a closing spring which is charged by the rotation of said ratchet wheel, and a catch arranged to come into engagement with the tip of said pawl when the tip of said pawl rides on said outer circumferential toothless portion of said ratchet wheel and to be brought out of said engagement by the rocking motion of said pawl.

* * * * *